United States Patent
Kojima et al.

(10) Patent No.: US 7,916,902 B2
(45) Date of Patent: Mar. 29, 2011

(54) ALBUM CREATING APPARATUS, ALBUM CREATING METHOD, AND ALBUM CREATING PROGRAM

(75) Inventors: Kenji Kojima, Tokyo (JP); Shuji Ono, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 911 days.

(21) Appl. No.: 11/794,909

(22) PCT Filed: Jan. 13, 2006

(86) PCT No.: PCT/JP2006/005315
§ 371 (c)(1),
(2), (4) Date: Jul. 9, 2007

(87) PCT Pub. No.: WO2006/103952
PCT Pub. Date: Oct. 5, 2006

(65) Prior Publication Data
US 2008/0069409 A1  Mar. 20, 2008

(30) Foreign Application Priority Data

Mar. 29, 2005 (JP) .............................. 2005-095903

(51) Int. Cl.
*G06K 9/00* (2006.01)
*G06K 9/36* (2006.01)
*G06K 9/46* (2006.01)
(52) U.S. Cl. ...................................... 382/115; 382/284
(58) Field of Classification Search ................... 382/115, 382/118, 162, 164, 165, 173, 181, 190, 224, 382/284, 305; 345/113–115, 121, 429, 433, 345/435, 619, 629; 358/1.15, 1.18, 403, 358/450, 501, 515, 520, 528, 530; 348/222.1, 231.2, 584, E5.031; 707/3, 4, 104.1
See application file for complete search history.

(56) References Cited

U.S. PATENT DOCUMENTS

| | | | |
|---|---|---|---|
| 5,818,457 A | | 10/1998 | Murata et al. |
| 7,019,856 B2 | * | 3/2006 | Kawabata ..................... 358/1.15 |
| 7,281,021 B2 | * | 10/2007 | Shiota et al. ................... 382/284 |
| 7,362,919 B2 | * | 4/2008 | Das et al. ....................... 382/284 |
| 7,760,917 B2 | * | 7/2010 | Vanhoucke et al. ........... 382/115 |
| 7,764,311 B2 | * | 7/2010 | Bill .............................. 348/222.1 |
| 2003/0107585 A1 | * | 6/2003 | Samuelson .................... 345/629 |
| 2006/0203012 A1 | * | 9/2006 | Nakajima ...................... 345/629 |
| 2007/0172131 A1 | * | 7/2007 | Chosokabe .................... 382/224 |
| 2007/0216950 A1 | * | 9/2007 | Yamakado et al. ........... 358/1.18 |
| 2008/0069409 A1 | * | 3/2008 | Kojima et al. ................ 382/115 |
| 2009/0003731 A1 | * | 1/2009 | Nitta et al. .................... 382/298 |
| 2009/0225191 A1 | * | 9/2009 | Tachikawa et al. ......... 348/231.2 |

FOREIGN PATENT DOCUMENTS

| EP | 0 626 657 A2 | 5/1994 |
|---|---|---|
| WO | WO-2004/055696 A2 | 7/2004 |

* cited by examiner

*Primary Examiner* — Amir Alavi
(74) *Attorney, Agent, or Firm* — Birch, Stewart, Kolasch & Birch, LLP

(57) ABSTRACT

An album creating apparatus which allows coloring parts other than a captured image in the album suited to a person included in the captured image and an album viewer based on an age of the person included in the captured image and an age of the album viewer. The album creating apparatus includes: an age identifying unit for identifying an age of a person included in a captured image composing the album or an age of a person viewing the album; a color selecting unit for selecting color used for parts other than the captured image in the album based on the age identified by the age identifying unit; and a coloring unit for coloring parts other than the captured image in the album using the color selected by the color selecting unit.

9 Claims, 5 Drawing Sheets

ALBUM CREATING APPARATUS, ALBUM CREATING METHOD, AND ALBUM CREATING PROGRAM

The present application claims priority from Japanese Patent Applications No. JP 2005-095903 filed on Mar. 29, 2005. The present application is the national phase of PCT International Application No. PCT/JP06/305315 filed on Mar. 13, 2006 under 35 U.S.C. §371.

TECHNICAL FIELD

The present invention relates to an album creating apparatus, an album creating method, and an album creating program. Particularly, the present invention relates to an album creating apparatus, an album creating method, and an album creating program for coloring parts other than captured images in an album.

BACKGROUND ART

Conventionally, a method of automatically inserting an image of a user into a prescribed scene of a moving image of a prepared movie etc., and recording a composite image in which an image of the user is synthesized to the scene is proposed, as disclosed in Japanese Patent Application Publication No. 2003-163888.

DISCLOSURE OF THE INVENTION

Problems to be Solved by the Invention

However, the conventional method disclosed in the Japanese Paten Application Publication No. 2003-163888 creates only a uniformed image even when the users are different. Additionally, the method does not change parts other than a captured image based on the user who views the image. It follows that a satisfaction level of the user who views the image is not necessarily enhanced.

Thus, it is an object of the present invention to provide an album creating apparatus, an album creating method and an album creating program which is capable of solving the problem accompanying the conventional art. The above and other objects can be achieved by combining the features recited in independent claims. Then, dependent claims define further effective specific example of the present invention.

Means for Solving the Problems

To solve the above-described problem, a first aspect of the present invention provides an album creating apparatus for coloring parts other than captured images in an album. The album creating apparatus includes: an age identifying unit for identifying an age of a person included in a captured image composing the album or an age of a person viewing the album; a color selecting unit for selecting color used for parts other than the captured image in the album based on the age identified by the age identifying unit; and a coloring unit for coloring parts other than the captured image in the album using the color selected by the color selecting unit.

The color selecting unit may select the color with lower chroma saturation when the age identified by the age identifying unit is older. The color selecting unit may select the color with lower lightness when the age identified by the age identifying unit is older. Additionally, the album creating apparatus may further includes a color pallet data storing unit for storing color pallet data denoted a plurality of predetermined color combinations corresponding to an age. The color selecting unit may select the color pallet stored in the color pallet data storing unit in association with the age identified by the age identifying unit. The coloring unit may color the parts other than the captured image in the album using the plurality of the color combinations of the color pallet selected by the color selecting unit.

The album creating apparatus may further includes a color area determining unit for determining an area of the color selected by the color selecting unit in the album smaller when the age identified by the age identifying unit is older. The album creating apparatus may further includes a person image extracting unit for extracting a person image being the image of the person included in the captured image composing the album. The age identifying unit may identify the age of the person included in the captured image composing the album based on the person image extracted by the person image extracting unit. Additionally, the person image extracting unit may extract a face image being the image of the face included in the extracted person image. The age identifying unit may identify the age of the person included in the captured image composing the album based on an eye position to a region of the face of the face image extracted by the person image extracting unit.

The album creating apparatus may further include a displaying unit for sequentially displaying each page of the album. The age identifying unit may identify the age of the person viewing the page of the album displayed by the displaying unit. The color selecting unit may select color used for parts other than the captured image in a next page of the album based on the age identified by the age identifying unit. The coloring unit may color the parts other than the captured image in the next page of the album using the color selected by the color selecting unit. Additionally, the displaying unit may display the next page of the album colored by the coloring unit.

The album creating apparatus may further includes a image capturing unit for capturing an image of a person viewing the page of the album displayed by the displaying unit, and a person image extracting unit for extracting a person image being the image of the person included in a viewer image captured by the image capturing unit. The age identifying unit may identify the age of the person viewing the page of the album displayed by the displaying unit based on the person image extracted by the person image extracting unit.

According to a second aspect of the present invention, an album creating method includes; an age identifying step of identifying an age of a person included in a captured image composing the album or an age of a person viewing the album; an color selecting step of selecting color used for parts other than the captured image in the album based on the age identified in the age identifying step; and a coloring step of coloring parts other than the captured image in the album using the color selected in the color selecting step.

According to a third aspect of the present invention, a program for an album creating apparatus for coloring parts other than a captured image in the album, the program operates the album creating apparatus to function as: an age identifying unit for identifying an age of a person included in a captured image composing the album or an age of a person viewing the album; a color selecting unit for selecting color used for parts other than the captured image in the album based on the age identified by the age identifying unit; and a coloring unit for coloring parts other than the captured image in the album using the color selected by the color selecting unit.

Here, all necessary features of the present invention are not listed in the summary of the invention. The sub-combinations of the features may become the invention.

Effect of the Invention

According to the present invention, it is possible to color parts other than a captured image in an album suited to a person included in the captured image and an album viewer based on an age of the person included in the captured image and an age of the album viewer.

BEST MODE FOR CARRYING OUT THE INVENTION

Hereinafter, the present invention will now be described through preferred embodiments. The embodiments do not limit the invention according to claims and all combinations of the features described in the embodiments are not necessarily essential to means for solving the problems of the invention.

Figure 1:
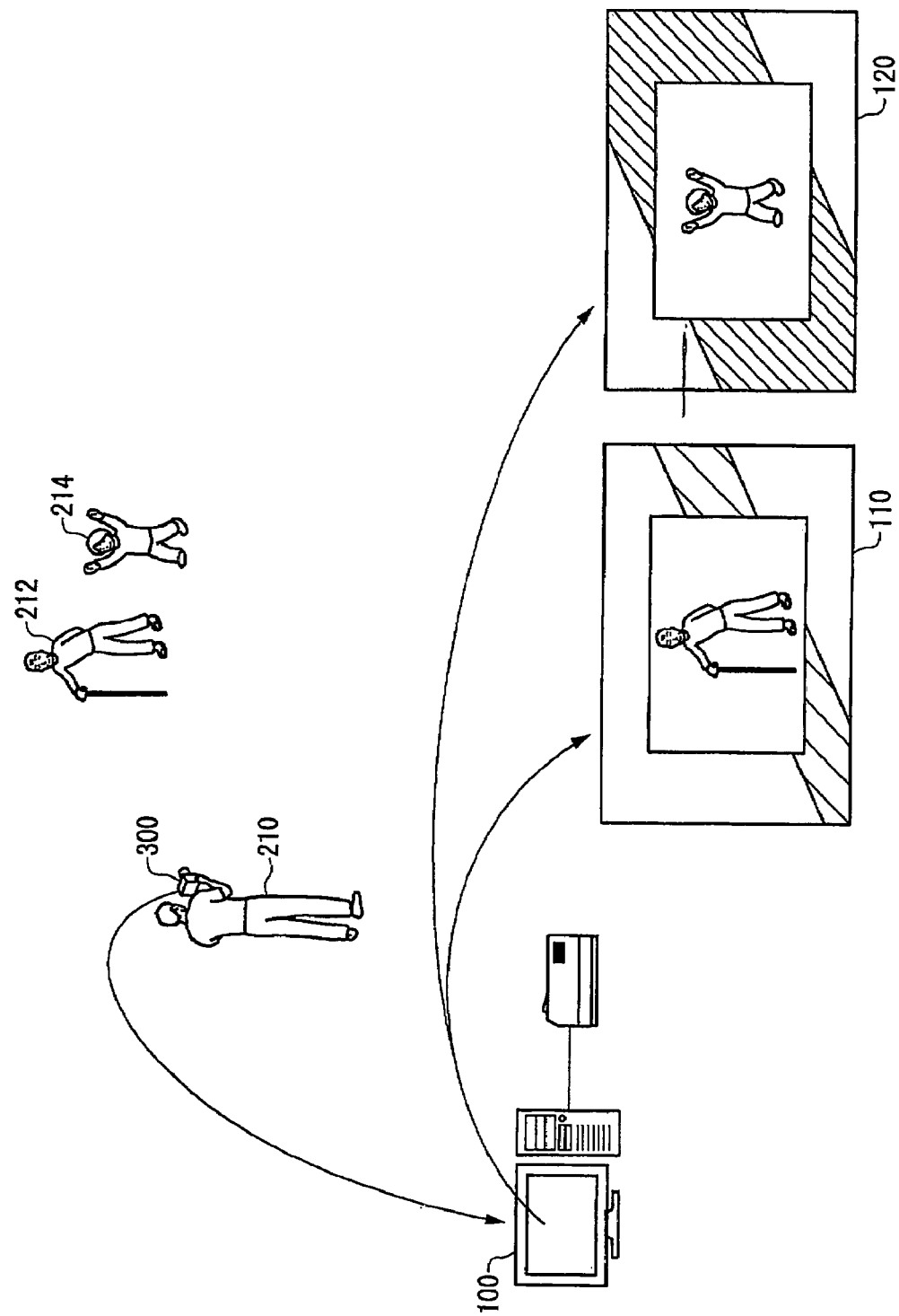
FIG. 1 is a schematic diagram of an album creating apparatus 100.

FIG. 1 shows a schematic diagram of an album creating apparatus 100. The album creating apparatus 100 identifies an age of a person included in a captured image which captured by an image capturing apparatus 300. Then, the album creating apparatus 100 colors parts other than a captured image in the album based on the age of the person who is taken in the image, when the album of the person is created. And, the album creating apparatus 100 identifies an age of a viewer of the album. Then, the album creating apparatus 100 colors parts other than a captured image in the album based on the age of the viewer.

Generally, an elderly people like colors with low lightness and low chroma saturation which creates an aura of sedate. While, a young people likes colors with high lightness and high chroma saturation which creates an aura of activity. Therefore, coloring the parts other than a captured image in the album based on the age of the person included in the captured image and the age of the viewer of the album enhances a user satisfaction.

For example, when an elderly people 212 is imaged with the image capturing apparatus 300 by a user 210, the album creating apparatus 100 identifies the age of the elderly people 212. And the album creating apparatus 100 selects color combinations of colors with low chroma saturation or low lightness or both low chroma saturation and low lightness, when the album creating apparatus 100 creates a page of an album 110 which includes a captured image of the elderly people 212. Then, the album creating apparatus 100 colors parts other than the captured image with selected color combinations. And the album creating apparatus 100 may color all of the parts other than the captured image or a part of the parts other than the captured image. Also, the album creating apparatus 100 may determine an area of the color smaller when the age of a subject is older.

While when a child 214 is imaged, the album creating apparatus 100 identifies an age of the child 214. Then, the album creating apparatus 100 selects color combinations of colors with high chroma saturation or high lightness or both high chroma saturation and high lightness, when the album creating apparatus 100 creates a page of the album 120 which includes a captured image of the child 214. Then, the album creating apparatus 100 colors parts other than the captured image with selected color combinations. And the album creating apparatus 100 may color all of the parts other than the captured image or a part of the parts other than the captured image. Also, the album creating apparatus 100 may determine an area of the color larger when the age of a subject is younger.

It is an object of the album creating apparatus 100 to color parts other than a captured image in the album suited to a person included in the captured image and an album viewer, based on an age of the person included in the captured image and an age of the album viewer.

Figure 2:
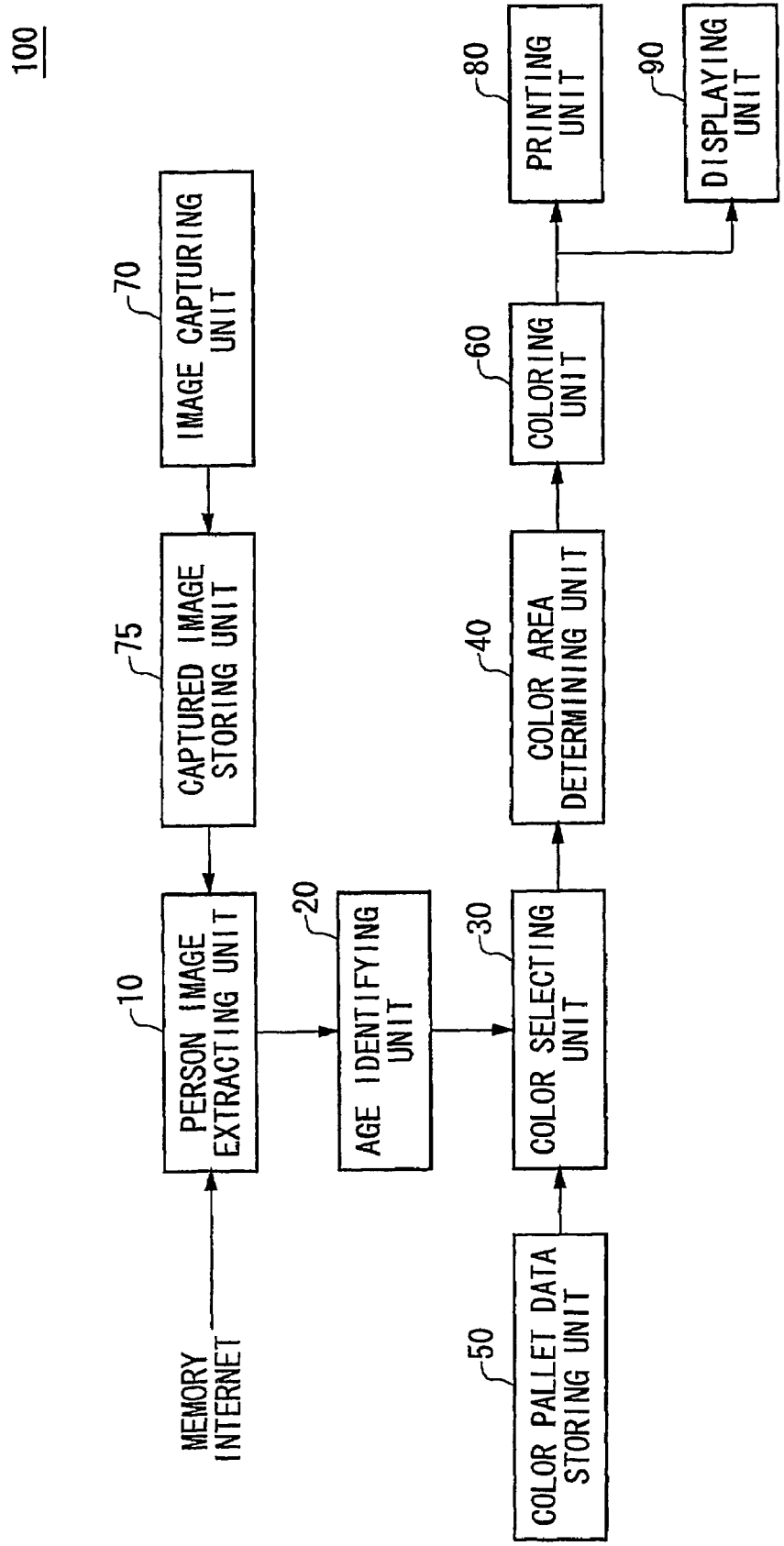
FIG. 2 is a block diagram showing a functional configuration of an album creating apparatus 100.

FIG. 2 shows a block diagram of a functional configuration of the album creating apparatus 100. The album creating apparatus 100 includes a person image extracting unit 10, an age identifying unit 20, a color selecting unit 30, a color area determining unit 40, a color pallet data storing unit 50, a coloring unit 60, an image capturing unit 70, a captured image storing unit 75, a printing unit 80, and a displaying unit 90. The album creating apparatus 100 accepts captured images which are imaged by the image capturing apparatus 300 over a memory of the image capturing apparatus 300 or a network of the Internet etc.

The captured images which are accepted from the image capturing apparatus 300 are provided to the person image extracting unit 10. The person image extracting unit 10 extracts a person image which is an image of the person who is included in the captured image composing the album. The person image extracting unit 10 may extracts the person image with an image data processing, for example, a contour definition process and a color distribution analysis etc. The person image extracting unit 10 provides the extracted person image to the age identifying unit 20.

And, the person image extracting unit 10 extracts a face image which is an image of the face of the person who is included in the captured image composing the album. The person image extracting unit 10 can extract the face image with a method described as follows. First, the person image extracting unit 10 detects a subject included in the captured image with the image data processing, for example, the contour definition process and the color distribution analysis etc. Then, the person image extracting unit 10 detects an amount of characteristic which is specific to the person face, from the detected image of the subject. And, the person image extracting unit 10 extracts the face image of the person, for example, with the image data processing like a flesh color extracting etc. when the detected subject is a person.

The person image extracting unit 10 provides the extracted face image to the age identifying unit 20. The age identifying unit 20 identifies the age of the person who is included in the captured image composing the album from the accepted person image and face image. The age identifying unit 20 may identify the age from a clothes and a posture etc. of the imaged person. For example, the age identifying unit 20 can identify the imaged person Is advanced age when the person is bent greater than a predetermined angle.

Additionally, the age identifying unit 20 may identify the age of the imaged person from the face image of the person which is imaged. The age identifying unit 20 identifies the age based on a profile of the face, wrinkle in the face, a pigmented spot, hair color, and sag of the person's cheeks etc. For example, the person image extracting unit 10 extracts the profile of the face from the face image. And the age identifying unit 20 divides the profile of the face into predetermined regions. Next, the age identifying unit 20 calculates a curvature of each divided regions. Then, the age identifying unit 20 may identify the age of the person associated with the face image older, when the number of the segment of the small value of calculated curvature is larger.

Additionally, the age identifying unit 20 can identify the age of the person associated with the face image older, when the number of the wrinkle in the face is larger or the amount of the sag of the person's cheeks is larger. Additionally, the age identifying unit 20 may identify the age of the person included in the captured image based on an eye position to a region of the face of the face image extracted by the person image extracting unit 10. The age identifying unit 20 provides the identified age of the person included in the captured image to the color selecting unit 30.

The color pallet data storing unit 50 stores data of the color pallet which are predetermined color combinations in association with the age. The color pallet may be visually harmonized combination of colors. Additionally, the color pallet data storing unit 50 may store the color pallet being put on the Internet etc. or being recorded in a recording media, for example, a semiconductor memory etc.

For example, the age of person are categorized into a plurality of categories such as under 5 years old, in the 6 to 10 age group, in the 11 to 15 age group, in the 16 to 20 age group, in the 21 to 30 age group, in the 30 to 40 age group, and over 40 years old. And the color pallet data storing unit 50 stores color pallet data in association with each of categorized ages. The combinations of a plurality of colors in the color pallet are, for example, combinations of high chroma saturation colors and high lightness colors when the age is younger. And the combinations of a plurality of colors in the color pallet are combinations of low chroma saturation colors and low lightness colors when the age is older. In addition, the categories of the age are not limited to the categories of the above-mentioned, and the age of person are categorized into a plurality of categories according to a fashion of user's favor and colors etc. The color pallet data storing unit 50 provides color pallets to the color selecting unit 30.

The color selecting unit 30 selects combinations of a plurality of colors, which are colored parts other than the captured image in the album, from color pallets stored in the color pallet data storing unit 50 based on the age of the person identified by the age identifying unit 20. And the color selecting unit 30 accepts the selected color pallet from the color pallet data storing unit 50.

The color selecting unit 30 selects lower chroma saturation colors from the color pallet which is accepted from the color pallet data storing unit 50 when the age of the person, included in the captured image, identified by the age identifying unit 20 is older. And the color selecting unit 30 selects lower lightness colors from the color pallet which is accepted from the color pallet data storing unit 50 when the age of the person included in the captured image identified by the age identifying unit 20 is older. In addition, the color selecting unit 30 may select both lower chroma saturation colors and lower lightness colors from the color pallet which is accepted from the color pallet data storing unit 50 when the age of the person included in the captured image identified by the age identifying unit 20 is older.

The color selecting unit 30 provides the selected color pallet and the age of the person identified by the age identifying unit 20 to the color area determining unit 40. The color area determining unit 40 determines the area of the parts other than the captured images in the album, which is colored with colors selected by the color selecting unit 30, smaller when the age of the person identified by the age identifying unit 20 is older.

The color area determining unit 40 provides the color pallet selected by the color selecting unit 30 and the area, which should be colored, determined by the color area determining unit 40 to the coloring unit 60. The coloring unit 60 colors the parts, which correspond to the area determined by the color area determining unit 40, other than the captured image, with the combination of a plurality of colors included in the accepted color pallet.

The coloring unit 60 provides the colored image, which is colored in the parts other than the captured image, as an image for a page of the album to the printing unit 80 and to the displaying unit 90. The printing unit 80 creates the page of the album by printing the accepted image for the page of the album. Additionally, the displaying unit 90 displays each of the images for the page of the album on a monitor etc. page by page in sequence. Then the image capturing unit 70 captures an image of the person who views the page of the album displayed by the displaying unit 90.

The image capturing unit 70 provides the image of the person who views the album, which is captured by the image capturing unit 70, to the captured image storing unit 75. The captured image storing unit 75 stores an audience image. The term the audience image here may mean the image which includes the captured image of the viewer. And the captured image storing unit 75 provides the stored audience image to the person image extracting unit 10. The person image extracting unit 10 extracts the person image of the viewer from the audience image, based on almost the same function of the above mentioned person image extracting unit 10.

Additionally, the age identifying unit 20 identifies the age of the viewer based on almost the same function of the above mentioned age identifying unit 20. Then the color pallet data storing unit 50, the color selecting unit 30, and the color area determining unit 40 identify the color associated with the age of the viewer and the area of the parts other than the captured image where should be colored, based on the almost the same functions of the above mentioned functions.

Then the coloring unit 60 colors the parts other than the captured image of a next page of the album which is viewed by the viewer, with the combination of a plurality of colors selected by the color selecting unit 30. Additionally, the displaying unit 90 displays the next page of the album colored by the coloring unit 60.

The album creating apparatus 100 according to the present embodiment can identify the age of the person who is included in the captured image and can identify the combination of the colors depending on the identified age. Therefore, the user can create the album composed an appropriate design corresponding to the age of the person of the subject. Therefore, it can improve the satisfaction of the user.

Additionally, the album creating apparatus 100 according to the present embodiment can identify the age of the viewer who views the album and can display the image which is colored the parts other than the captured image with the selected color based on the age of the viewer. Therefore, the user can create the album composed an appropriate color corresponding to the age of the viewer. Therefore, it can improve the satisfaction of the viewer.

Figure 3:
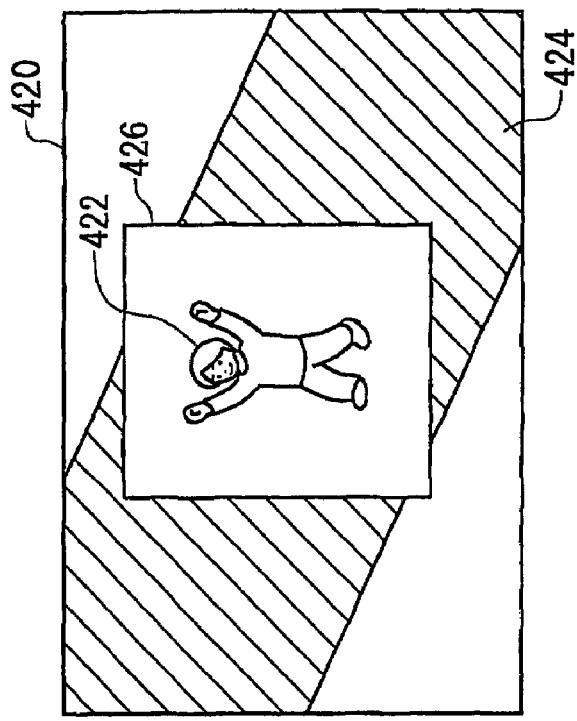
FIG. 3 shows a processing of a color area determining unit 40.
Figure 3:
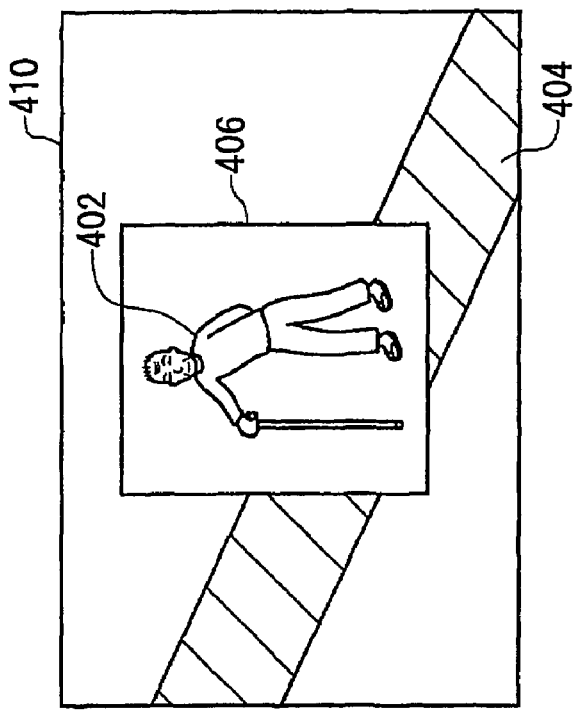

FIG. 3 shows an example of a process of determining the area in which is colored by the color area determining unit 40. The color area determining unit 40 determines the area of the album, in which is colored with colors selected by the color selecting unit 30, smaller when the age of the person identified by the age identifying unit 20 is older. For example, the color area determining unit 40 categorizes the age by dividing predetermined range. And the color area determining unit 40 may determine the area of the album in association with the divided range of the age.

For example, the area of the coloring part 404 is set smaller than the area of the album page 410 and laid out on the album page 410 other than the captured image 406 when the elderly person 402 is taken of the image. And the area of the coloring part 424 may be set larger than the area of the album page 420 and may lay out on the album page 420 when the child 422 is taken of the image. And the album may be displayed, of which page viewed by the viewer is colored, based on the age of the viewer who is taken of the image by the image capturing unit 70.

The album creating apparatus 100 according to the present embodiment can determine the area of the parts other than the captured image of the album in which the color is colored based on the age of the subject. Therefore, the album of the elderly person can create an aura of sedate and the album of the young person can create an aura of activity. Therefore, it can improve the satisfaction of the user.

Additionally, the album creating apparatus 100 according to the present embodiment can determine the area of the parts other than the captured image of the album in which the color is colored based on the age of the viewer. Therefore, a color appropriate in each viewer can be colored in an appropriate area, it can improve the satisfaction of the viewer.

Figure 4:
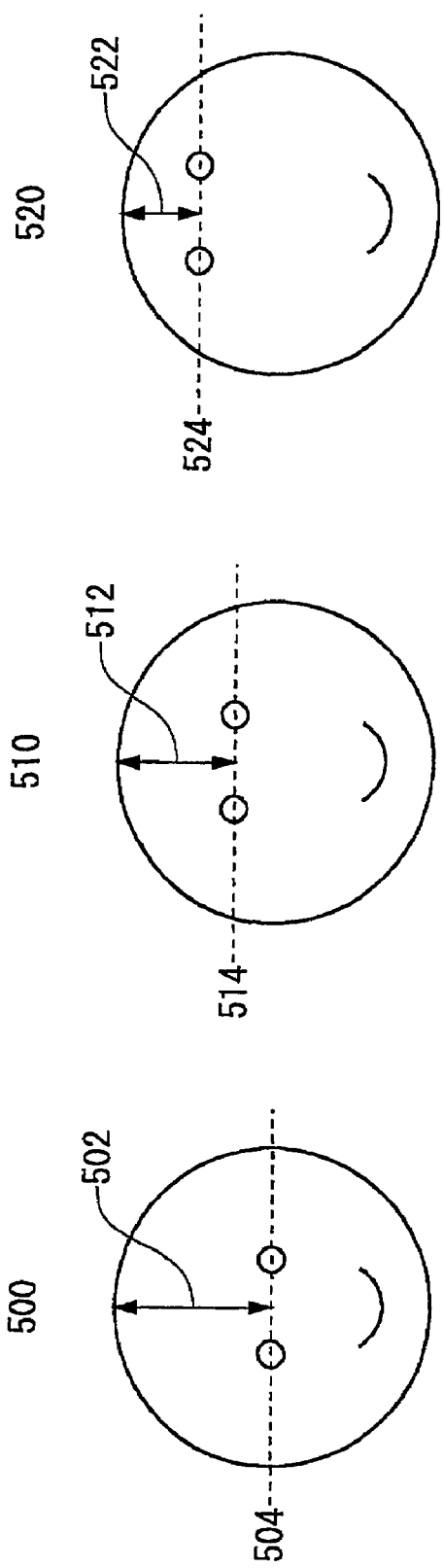
FIG. 4 shows a processing of an age identifying unit 20.

FIG. 4 shows an example of a process of determining the age of the person by the age identifying unit 20. The age identifying unit 20 identifies the age based on an eye position to a region of the face of the face image extracted by the person image extracting unit 10. The older the person is, the larger the distance between the eye position to the region of the face and a top of the head. Therefore, the age identifying unit 20 can identify the age of the person based on the distance between the eye position and the top of the head.

For example, referring to a view showing a frame format of the face 500, when the distance 502 between the eye position 504 and the top of the head is larger than the predetermined distance, the age identifying unit 20 can identify the age of the person who is associated with the view showing a frame format of the face 500 is young. And in cases where the person who is associated with the view showing a frame format of the face 510 and the person who is associated with the view showing a frame format of the face 520, the distance 522 between the eye position 524 and the top of the head is shorter than the distance 512 between the eye position 514 and the top of the head. In this case the age identifying unit 20 can identify the person who is associated with the view showing a frame format of the face 520 is older than the person who is associated with the view showing a frame format of the face 510.

The album creating apparatus 100 according to the present embodiment can identify the age of the subject and the viewer based on the eye positions to the region of the face of the subject and the viewer. Therefore, the album creating apparatus 100 can select the combination of colors which is apt for the subject and the viewer and can create the album with the selected combination of colors. Therefore, it can give the viewer of the album a lot of felling of satisfaction.

Figure 5:
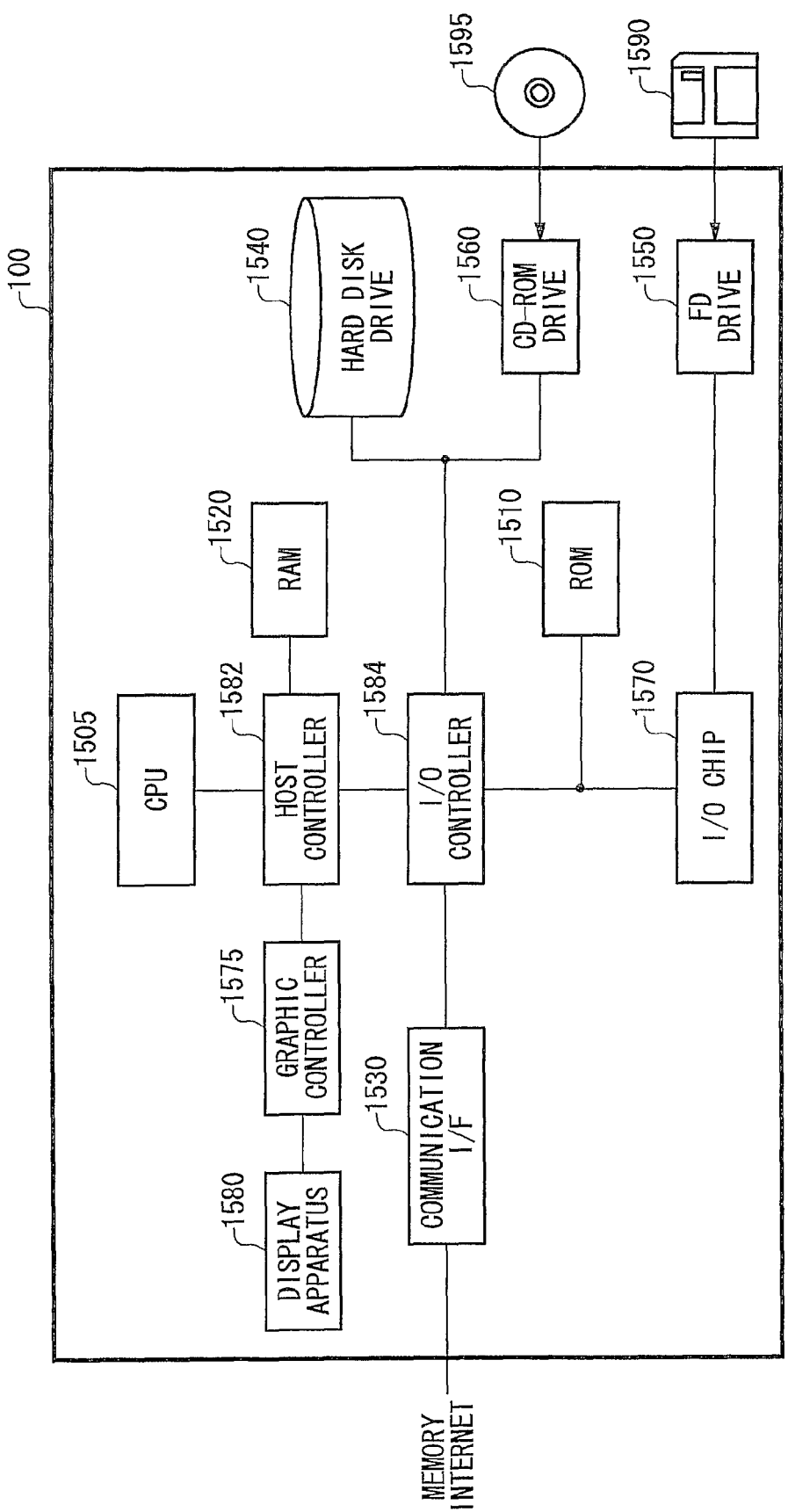
FIG. 5 is a block diagram showing a hardware configuration of an album creating apparatus 100.

FIG. 5 is a block diagram showing a hardware configuration of the album creating apparatus 100 according to the present embodiment. The album creating apparatus 100 includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM with a high transfer rate. The CPU 1505 operates according to the programs stored in the ROM 1510 and the RAM 1520 to control each unit. The graphic controller 1575 obtains image data generated on a frame buffer provided in the RAM 1520 by the CPU 1505 and displays the same on the display 1580. Alternatively, the graphic controller 1575 may include therein a frame buffer for storing image data generated by the CPU 1505.

The input/output controller 1584 connects the host controller 1582 to the hard disk drive 1540, a communication interface 1530 and a CD-ROM drive 1560 which are relatively high-speed input/output units. The communication interface 1530 communicates with the other units through a network. The hard disk drive 1540 stores the program and data used by the CPU 1505 of the album creating apparatus 100. The CD-ROM drive 1560 reads the program or data from the CD-ROM 1595 and provides the same to the hard disk drive 1540 and the communication interface 1530 through the RAM 1520.

The ROM 1510, and the flexible disk drive 1550 and input/output chip 1570 which are relatively low-speed input/output units are connected to the input/output controller 1584. The ROM 1510 stores a boot program executed by the album creating apparatus 100 at activating and a program depending on the hardware of the album creating apparatus 100. The flexible disk drive 1550 reads the program or data from a flexible disk 1590 and provides the same to the hard disk drive 1540 through the RAM 1520. The input/output chip 1570 connects various input/output units through the flexible disk drive 1550 and such as a parallel port, a serial port, a keyboard port and a mouse port.

An album creating program provided to the hard disk drive 1540 through the RAM 1520 is stored in a recording medium, such as the flexible disk 1590, the CD-ROM 1595, or an IC card and provided by the user. The album creating program is read from the recording medium, installed in the hard disk drive 1540 in the album creating apparatus 100 through the RAM 1520 and executed by the CPU 1505. The album creating program installed and executed in the album creating apparatus 100 operates the CPU 1505 to function the album creating apparatus 100 as the above-described the person image extracting unit 10, the age identifying unit 20, the color selecting unit 30, the color area determining unit 40, the color pallet data storing unit 50, the coloring unit 60, the image capturing unit 70, the captured image storing unit 75, the printing unit 80, and the displaying unit 90 with reference to FIG. 1-FIG. 4.

The above-described album creating program may be stored in an external storage medium. The external recording medium may be an optical storage medium such as a DVD and a PD, a magneto-optical recording medium such as a MD, a tape medium and a semiconductor memory such as an IC card in addition to the flexible disk 1590 and the CD-ROM 1595. A storage medium such as a hard disk or a RAM which is provided in the server system connected to a private communication network or Internet is used as the recording medium to provide the album creating program to the album creating apparatus 100 through the network.

While the present invention has been described with the embodiment, the technical scope of the invention not limited to the above described embodiment.

It is apparent to persons skilled in the art that various alternations and improvements can be added to the above-described embodiment. It is apparent from the scope of the claims that the embodiment added such alternation or improvements can be included in the technical scope of the invention.

The invention claimed is:

1. An album creating apparatus comprising:
   an age identifying unit for identifying an age of a person included in a captured image composing the album or an age of a person viewing the album;
   a color selecting unit for selecting color used for parts other than the captured image in the album based on the age identified by the age identifying unit; and
   a coloring unit for coloring parts other than the captured image in the album using the color selected by the color selecting unit, wherein
   the color selecting unit selects the color with lower chroma saturation or lower lightness when the age identified by the age identifying unit is older.

2. The album creating apparatus according to claim 1, further comprising a color pallet data storing unit for storing color pallet data denoted a plurality of predetermined color combinations corresponding to an age, wherein
   the color selecting unit selects the color pallet stored in the color pallet data storing unit in association with the age identified by the age identifying unit, and
   the coloring unit colors the parts other than the captured image in the album using the plurality of the color combinations of the color pallet selected by the color selecting unit.

3. The album creating apparatus according to claim 1, further comprising a color area determining unit for determining that an area of the color selected by the color selecting unit in the album is smaller when the age identified by the age identifying unit is older.

4. The album creating apparatus according to claim 1, further comprising a person image extracting unit for extracting a person image being the image of the person included in the captured image composing the album, wherein the age identifying unit identifies the age of the person included in the captured image composing the album based on the person image extracted by the person image extracting unit.

5. The album creating apparatus according to claim 4, wherein
   the person image extracting unit extracts a face image being the image of the face included in the extracted person image, and
   the age identifying unit identifies the age of the person included in the captured image composing the album based on an eye position to a region of the face of the face image extracted by the person image extracting unit.

6. The album creating apparatus according to claim 1, further comprising a displaying unit for displaying a page of the album page by page in sequence, wherein
   the age identifying unit identifies the age of the person viewing the page of the album displayed by the displaying unit,
   the color selecting unit selects color used for parts other than the captured image in a next page of the album based on the age identified by the age identifying unit,
   the coloring unit colors the parts other than the captured image in the next page of the album using the color selected by the color selecting unit, and
   the displaying unit displays the next page of the album colored by the coloring unit.

7. The album creating apparatus according to claim 6, further comprising:
   an image capturing unit for capturing an image of a person viewing the page of the album displayed by the displaying unit, and
   a person image extracting unit for extracting a person image being the image of the person included in a viewer image captured by the image capturing unit, wherein
   the age identifying unit identifies the age of the person viewing the page of the album displayed by the displaying unit based on the person image extracted by the person image extracting unit.

8. An album creating method, comprising:
   an age identifying step of identifying an age of a person included in a captured image composing the album or an age of a person viewing the album;
   an color selecting step of selecting color used for parts other than the captured image in the album based on the age identified by the age identifying unit; and
   a coloring step of coloring parts other than the captured image in the album using the color selected by the color selecting unit, wherein
   the color selecting step selects the color with lower chroma saturation or lower lightness when the age identified in the age identifying step is older, and
   the album creating method uses a processor to perform the age identifying step, the color selecting step, and the coloring step.

9. A non-transitory computer-readable medium having instructions stored thereon for an album creating apparatus for coloring parts other than a captured image in the album, said instructions are read and executed by a processor for operating the album creating apparatus to function as:
   an age identifying unit for identifying an age of a person included in a captured image composing the album or an age of a person viewing the album;
   a color selecting unit for selecting color used for parts other than the captured image in the album based on the age identified by the age identifying unit; and
   a coloring unit for coloring parts other than the captured image in the album using the color selected by the color selecting unit, wherein
   the color selecting unit selects the color with lower chroma saturation or lower lightness when the age identified by the age identifying unit is older.

* * * * *